Nov. 15, 1927.  1,648,937
W. H. DICKERSON
SPRAY DRYING APPARATUS
Filed Jan. 9, 1923  5 Sheets-Sheet 1

Inventor
Walter H. Dickerson
By his Attorney

Nov. 15, 1927.

W. H. DICKERSON

SPRAY DRYING APPARATUS

Filed Jan. 9, 1923

Inventor
Walter H. Dickerson
By his Attorney

Nov. 15, 1927.

W. H. DICKERSON 1,648,937

SPRAY DRYING APPARATUS

Filed Jan. 9, 1923   5 Sheets-Sheet 5

Inventor
Walter H Dickerson
By his Attorney

Patented Nov. 15, 1927.

1,648,937

UNITED STATES PATENT OFFICE.

WALTER H. DICKERSON, OF EAST ORANGE, NEW JERSEY, ASSIGNOR TO INDUSTRIAL WASTE PRODUCTS CORPORATION, OF DOVER, DELAWARE, A CORPORATION OF DELAWARE.

SPRAY-DRYING APPARATUS.

Application filed January 9, 1923. Serial No. 611,679.

The invention relates to novel apparatus suitable for carrying on processes effective for the evaporation, concentration, desiccation or dehydration of various liquids containing solid matter in solution, or in suspension as emulsions and slurries. The process, as carried out in the apparatus of the present invention, comprehends, generally, subjecting a solid-containing liquid in finely-divided state to a suitable desiccating gaseous medium at the proper temperature and degree of dehydration.

The apparatus for carrying out the process consists essentially of a desiccating chamber into which the proper gaseous desiccating medium is introduced; and is provided with the usual peep-hole or holes and clean-out door or doors, the liquid to be desiccated being introduced, in finely divided-state, into an end of the chamber by a suitable spray or atomizing nozzle.

The material thus suspended in the gaseous medium may be withdrawn with said medium, preferably, at the opposite end of the desiccating chamber; and its travel is so directed therethru and such a velocity thereof attained that the formation of eddies and whirls is prevented and contact with the inner wall of the chamber is avoided. Means are provided, also, for affording additional supplies of gaseous media which may contain various materials, if desired; and the arrangement is such that the additional supply may be admitted at various stages in the drying operation.

In the case of a tower, the top may be provided with means to rectify the flow of the inflowing gaseous drying or moisture absorbing medium, as highly heated gas, and to insure thru any section of the tube a uniform flow thereof. To this end, a vaned distributor, comprising adjustable vanes, is provided at the entrance of the tube, the same being arranged, more or less tangentially to its periphery; and these vanes are designed to cooperate with further but stationary vanes located beyond the said movable vanes, the latter being radially directed in the upper portion of the tower and about the spray nozzle. The movable vanes are arranged to be set at various angles and are individually adjustable to control the volume and flow of the gaseous medium entering each segmental section afforded by the arrangement of the radial vanes located below same.

The flow of gaseous medium and finely subdivided solid containing liquid may be at low or at high velocity thru the tube; in the latter case, preserving in its passage thru the tube a more or less symmetrical form and the inertia of whose mass serves to prevent eddies and whirls and consequent contact with the inner wall of said tube. Moreover, one or more surrounding shells of moving gaseous medium may be provided to insulate the mass from the wall.

The nature of the invention, however, will best be understood when described in connection with the accompanying drawings, in which—

Similar characters of reference designate corresponding parts thruout the several views.

Figures 1, 5:
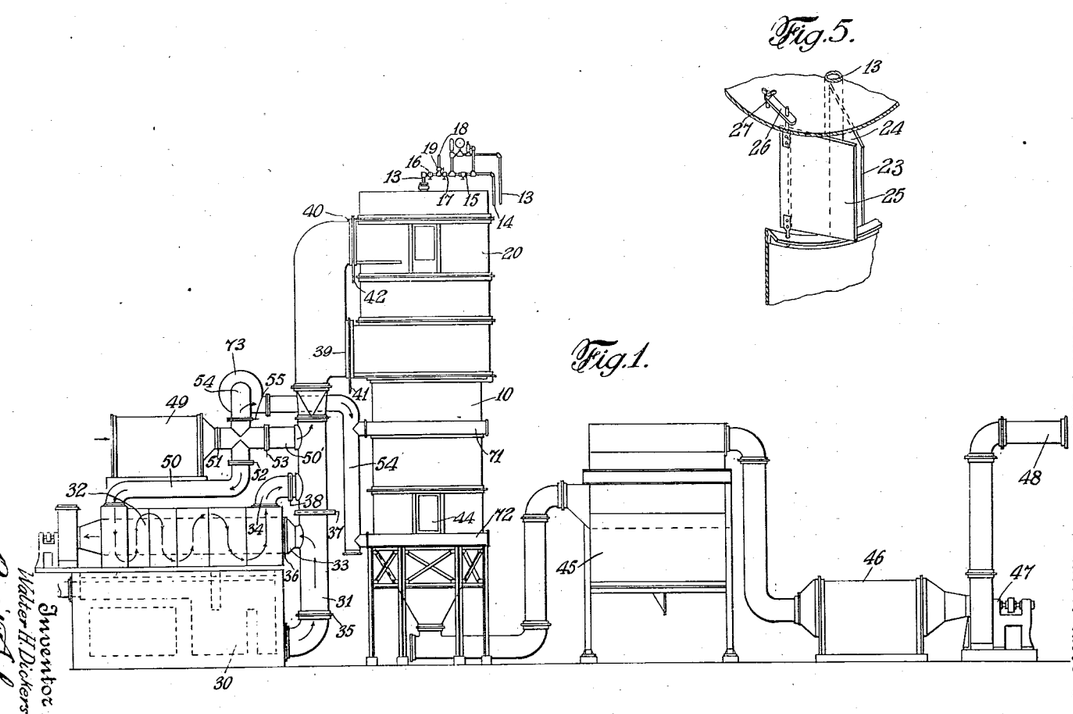
Fig. 1 is an elevation of the desiccating apparatus, more particularly of the type employing a tower form.
Fig. 5 is a fragmentary perspective view illustrating the arrangement of the controlling vanes for the gaseous desiccating medium.
Figure 2:
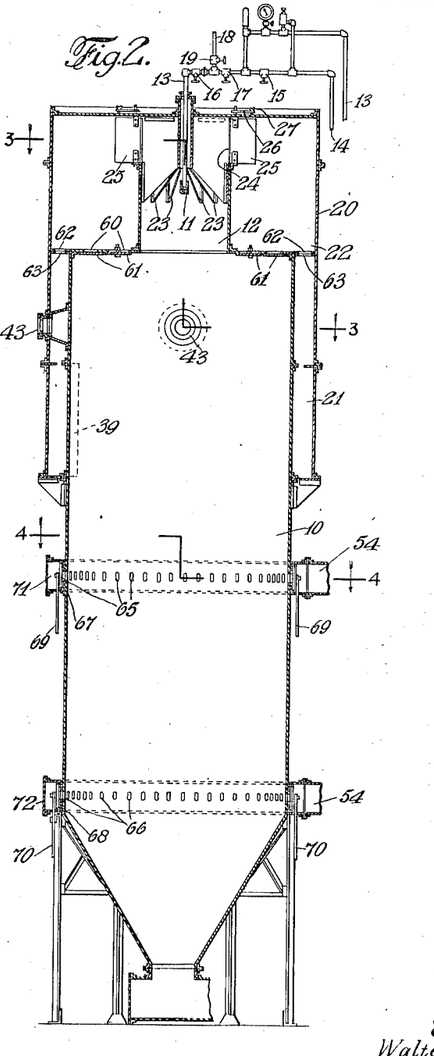
Fig. 2 is a vertical section thru the tower and on an enlarged scale.
Figure 3:
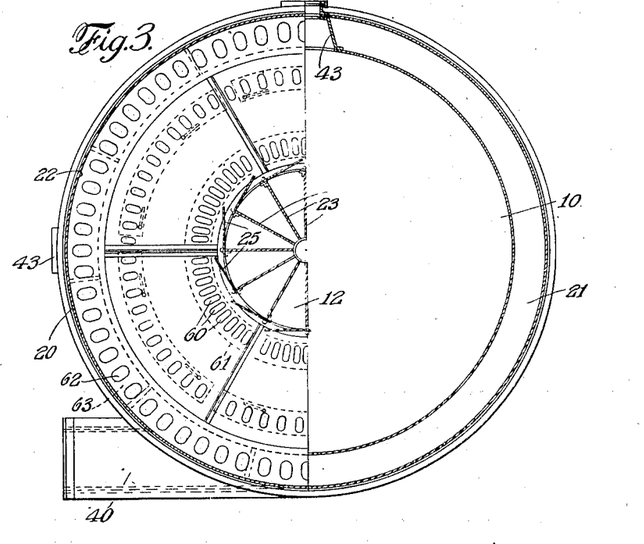
Fig. 3 is a horizontal section taken on the line 3—3, Fig. 2, looking in the direction of the arrows.
Figure 4:
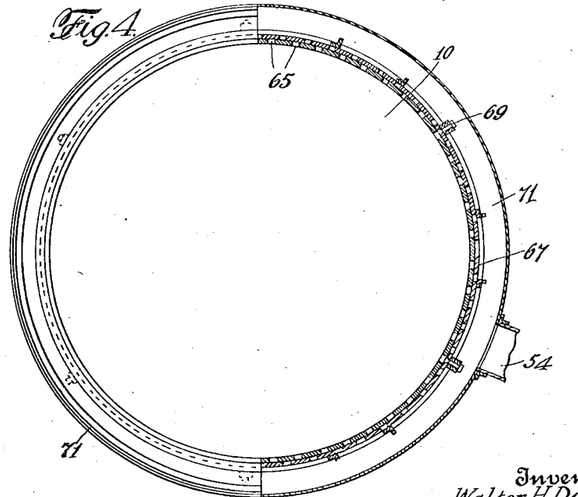
Fig. 4 is a horizontal section taken on the line 4—4, Fig. 2, looking in the direction of the arrows.

Referring to the drawings, and more particularly to Figs. 1 and 2 thereof, the desiccating apparatus is shown as comprising a vertical tower or tube 10, suitably proportioned to conform to the capacity desired and to the operations and mode of treatment in view. Into the top of this tube is to be introduced the solid-containing liquid to be desiccated. This may be effected by means of a spray nozzle 11, of any suitable and well-known type, the same being located, preferably, in a compartment 12 at the top of the tower and in the longitudinal axis of the tube, said chamber being of smaller diameter than said tube.

The solid-containing liquid is obtained from any suitable source of supply (not shown), and is delivered to the nozzle thru a supply or liquor pipe 13. This pipe is arranged, as shown, to be shunted by a return pipe 14; and the same includes a controlling or shut-off valve 15 for regulating the return flow, which may be shut off entirely if desired. A valve 16 is included in the liquor supply pipe for controlling the supply to the nozzle 11, and a further valve 17 is included therein between the valve 16 and the valve 15. Between the said valves 16 and 17 there is also connected a water supply pipe 18 provided with a shut-off valve 19. By this arrangement, a supply of water, for flushing and washing out the nozzle and tower prior to treating of different material, may be obtained thru proper manipulation of the various valves and as will readily be understood. Moreover, by suitably adjusting the valve 15, a predetermined proportion of the liquid may be caused to circulate thru the return pipe in providing for an excess circulation; and thereby accumulation or concentration of sediment in the liquid to be desiccated will be obviated and better operation of the nozzle afforded; also, clogging of the said nozzle is prevented.

The upper portion of the tower is surrounded by a casing 20 which affords a surrounding chamber or jacket 21 for the said upper portion of the tower, as well as a chamber 22 surrounding the chamber 12 containing the spray nozzle. As will hereinafter be more fully set forth, the jacket 21 may be disconnected from the air supply and thus rendered ineffective as would be desirable in the desiccation of liquids having constituents of low melting point characteristics.

About the nozzle 11 and extending slightly beyond same and to the wall of the chamber 12 is arranged a series of fixed vertical vanes 23 which are radially directed relatively to the said nozzle in the said chamber 12. Furthermore, the upper portion of the chamber 12 is provided with a peripheral and circular opening 24 of which the area is controlled by a plurality of adjustable vanes 25, pivotally mounted and arranged to be held in adjusted position thru a lever 26 and thumb nut 27 provided for each individual vane. These vanes, as shown, extend when in fully opened position beyond the periphery of the chamber and are arranged more or less tangentially thereto so that they may also substantially close off the opening 24 to the chamber 12. By setting the various vanes at suitable angles, in individually adjusting same, the gaseous medium may be controlled in entering each segmental section afforded by the arrangement of the fixed radial vanes 23. A unidirectional current of the gaseous medium is obtained thereby and eddy currents or irregular currents in the inflow thru the tube prevented.

In certain localities where air is hot and extremely dry, the chamber 12, or the openings thereto afforded by the vanes 25, may communicate directly with the atmosphere, and the tower will automatically produce and maintain its own flow of the drying air, regulated and controlled as aforesaid thru the vanes 25 and 23 and also rectified thereby to provide a desiccating flow of uniform velocity thruout the cross-sectional area of the tower in a downwardly moving column of gas and suspended material. This will be due to the cooling of the dry air and consequent increase of its specific gravity and reduction of volume thru contact with the solid-containing liquid from the spray nozzle 11, the content of which will be concentrated or dried thereby—all of which is more particularly set forth in my prior U. S. Patent No. 1,548,665. The action having once been set up, a continuous supply of dry air will pass in at the top of the tower and thru the spray zone at the upper end to effect not only the desired evaporation, concentration, or desiccation, but also to automatically maintain a continuous and very rapid circulation. Of course, other heated gases may be employed if at the proper degree of dehydration.

As a rule, however, it will be preferable to provide a positive supply of gaseous drying medium such as may be had either directly, as flue gases obtained, for example, from a furnace 30 as thru a duct 31. Or, air or other gaseous supply, from other external sources, may be heated by means of said furnace and a heater 32 and thru which heater the same is then arranged to pass, said heater having a connection 33 from the duct 31 and a connection 34 to the duct 31 for this purpose. Suitable controlling dampers 35, 36, 37 and 38 are provided to allow of regulating and changing the supply and whose operation will be readily understood.

Figure 6:
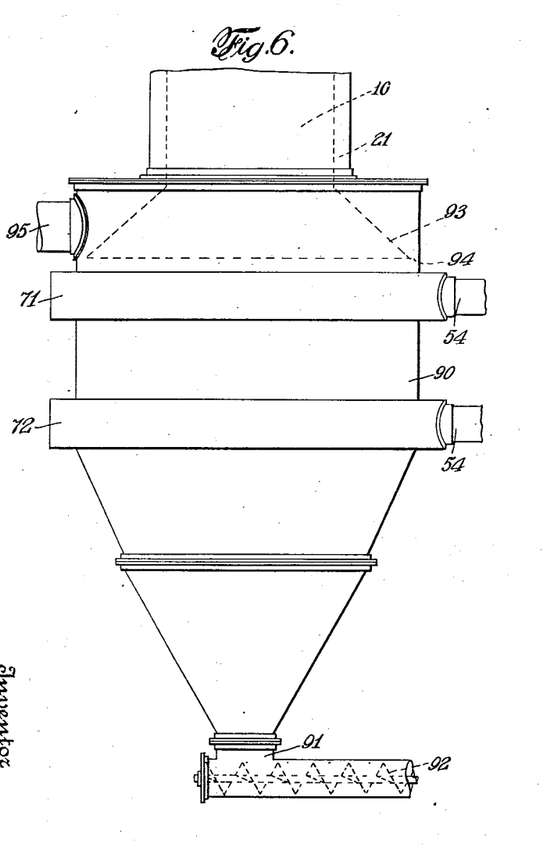
Fig. 6 is a fragmentary elevation.
Figure 7:
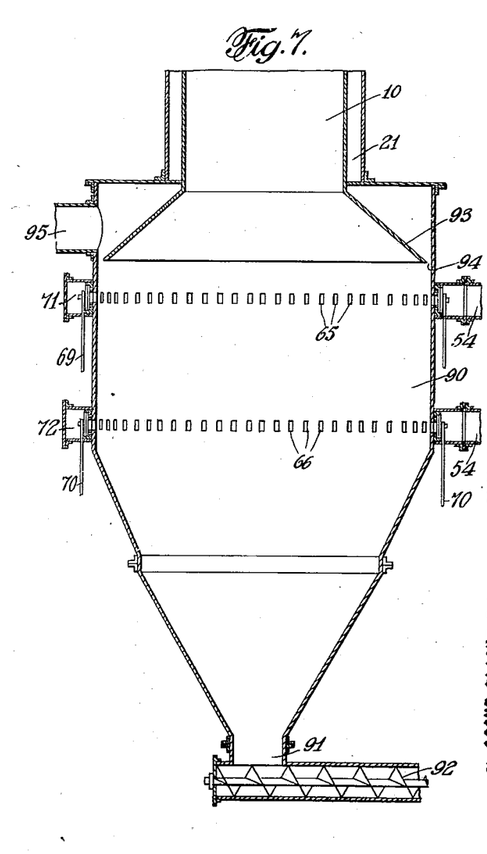
Fig. 7 a vertical section of the desiccating tower with modified lower end, said end being in the nature of a diffusion and settling chamber and provided at the bottom with means for removing the dried product.

The gaseous medium thus provided is introduced to the jacket 21 and the chamber 22 thru suitable inlets 39 and 40, which are provided with corresponding dampers 41 and 42 whereby the supply may be entirely cut off or regulated as required. From the chamber 22, as already explained, the gaseous medium passes thru the opening 24, controlled by the vanes 25, and between the vanes 23 into the drying tube 10 which is in communication with the chamber 12, the said gaseous medium passing about the finely-divided solid-containing liquid ejected by the nozzle. A peep opening 43 permits of inspection of the interior; and at the bottom of the tube or tower, a clean-out door 44 is provided. The desiccated material may be removed from the bottom of the tube or tower, as in the embodiment illustrated in Figs. 6 and 7; but it is preferred to carry same over to a collector 45 of any well-known or special type for separating out the desiccated material. The collector may be in the nature of a diffusion chamber whose diameter with respect to that of the tube is such that the velocity of the gaseous medium is considerably reduced, causing the particles to be precipitated therefrom; whereupon they may be removed from the bottom of the collector, as is well understood.

The effluent gas may then be caused to pass thru a scrubber 46 of any well-known type, and which is connected to a suction device 47 to be discharged thru the duct 48 directly to the atmosphere. In the case of the use of inert or valuable gaseous media whose recovery is desirable, and such as may be employed, for example, in the production of dry powdered sulfur and milk powder where an oxidizing gas would be unsuitable, the apparatus may be operated in a closed cycle. In such instances, the duct 48 would be connected to the inlet of the heater 32 or to a conditioning apparatus as a dehumidifier, humidifier or refrigerating apparatus 49, as the operations may demand. This latter device is arranged, thru a duct 50, to be connected with the heater 32; or, thru a duct 50' directly with the duct 31 by the manipulation of suitable dampers 51, 52 and 53. The duct 50' is connected, furthermore, to a duct 54 having an interposed damper 55 for the purpose hereinafter set forth.

For some purposes, the gaseous desiccating medium will be drawn thru the tube, by the suction induced by fan 47, at a comparatively low velocity; while for other purposes, a velocity as high as 10 feet or more per second will be required, and the fan or like apparatus operated accordingly. Thru the use of high velocities, the sprayed and finely-divided liquor will be so directed thru the tube, together with the gaseous medium in which it is suspended, and especially with comparatively small diameter tubes which the column of gas completely fills, that there will be no tendency of the partly desiccated particles to roll outwardly and adhere to the wall of the tube. Such velocities are especially suitable for the drying of starches, sugar juices and sugar containing materials, as glucose, and the drying of chemical salts and substances having low melting point constituents. The tube, furthermore, will thus be substantially filled by a rapidly moving column which maintains its form, more or less symmetrically, thruout the tube; and the prevention of eddy currents and whirls is attained thereby, the movement and direction of the particles dried being entirely within the control of the operator to avoid all whipping of the partly dried particles onto the inner wall of the tube. These particles, moreover, are subjected to uniform drying conditions and so treated as not to be in a condition to coalesce.

The character and action of the spray nozzle, of course, is also material in respect to the projection thru the tube; and the spray head may be changed to vary the diameter of the base of the cone of spray afforded thereby, which will be less than the diameter of the tube. As a general rule, a single spray nozzle in the longitudinal axis of the tube is preferred; but a plurality of spray nozzles is within the scope of the invention. The incoming gaseous medium is regulated by the vanes 25 to provide a flow, usually at high velocity, about and thru the spray cone to prevent frazzling of the sprayed material at the outer surface of the cone. This velocity of the incoming gaseous medium should be in excess of the velocity of the finely-divided particles at the outer edge of the spray cone and sufficient also to overcome the inertia of said particles and maintain same in the moving desiccating gaseous medium. It is desirable thus to avoid impingement on the inner wall of the drying tube of the particles to be desiccated, and the positive inward flow at high velocity, as aforesaid, is instrumental in preventing whirls and eddies as well as back-rolling or mushrooming thereof and will serve to carry along the entire product into the collecting system.

In this respect, the provision of the jacket 21 about the upper portion of the tube is also of advantage, as heated gaseous medium introduced thereto thru the inlet 39 will tend to prevent sticking upon the inner wall of the tube. However, in the drying of low melting point substances, the heat to jacket 21 may be cut off; and if necessary, a cooling medium may be supplied thereto.

The action is further enhanced and the effect of back rolling and mushrooming, in the case of the operation under lower velocities, prevented by the provision of a hollow cylinder or cylinders of gaseous medium to form a shell or shells surrounding the projected column or core of gaseous desiccating medium and suspended finely-divided solid-containing liquid, said shell confining the column and presenting an intervening substantially cylindrical body of gaseous medium. The wall of the tube, furthermore, will thereby be continuously swept clean of any product which might otherwise adhere thereto; and the diameter thereof may be materially reduced and the efficiency of the drying action increased.

To provide such cylindrical shell or shells of gaseous medium, the top of the tube is arranged with one or more concentric series of circularly arranged openings 60, and the same are covered by adjustable dampers 61 by which the supply of gas may be adjusted or entirely cut off, the openings being toward the inner circumference of the tube wall. If it be desired to provide solely the hollow, usually cylindrical, drying column, it will be understood that the upper adjustable vanes 25 will be adjusted to completely shut off the supply of gaseous medium at this point and the dampers 61 opened to admit the gaseous medium solely thru the opening 60 in the top of the tube. If both supplies be desired, to provide the solid containing liquid suspended therein and a hollow cylindrical body or shell of gas surrounding same, the adjustable vanes 25 also will be opened and set accordingly. Moreover, jacket 21 may be cut off from the chamber 22 by means of annular and perforated slides or dampers 62 movable over the opening 63 in the top of the jacket.

A supplementary supply of gaseous medium, which may be of the same character as that supplied to the chambers 12 and 22 and jacket 21, or which may be some other medium and at the same or a different temperature from the gaseous medium supplied to the said chambers 12 and 22, is arranged to be supplied to the tube at any desired portion thereof. For example, a zone of the supplementary gas may be provided, as shown, just below the bottom of the jacket 21 and substantially mid-way of the tube, as well as at the bottom thereof where the tube begins to contract to provide an exit from which the gaseous medium and material suspended therein are withdrawn and delivered, preferably, as to the collector 45. These supplementary supplies of gaseous media may be employed to control the temperature within the tube at different stages of the desiccation process or to recondition the medium therein as, for example, by providing a fresh source of dehydrated medium at the proper temperature, or to afford a roasting medium for the desiccated product.

To introduce conveniently such supplementary gaseous media to the tube, the latter is provided at the desired portions with circularly disposed peripheral openings as the openings 65 and 66. These openings are arranged to be controlled by a plurality of dampers 67 and 68, each of the dampers controlling a plurality of openings and being operated by respective levers 69 and 70. Surrounding said two series of openings and dampers are peripheral ducts 71 and 72 which communicate with the duct 54 thru which the desired medium is supplied. A blower 73 or the like may be included in this duct to afford means for projecting the medium, as a cooling gas, into the desiccating chamber at high velocity.

In the drying of solutions of material containing low melting point constituents, as sugar, and more especially such solutions as fruit juices, etc., which contain elements both of low melting point and of high hydroscopic properties, it is necessary not only to reduce the temperature to which the dry powdered product is exposed to a point sufficiently below the melting point of the particular constituents of low melting point, but also to have the drying gaseous medium of a sufficiently low humidity in order that the finished product will not absorb moisture therefrom when exposed to low temperature. This condition may be attained by providing the supplementary supply of gaseous medium properly dehydrated and at a low temperature. Moreover, while the individual particles in suspension are substantially dry at high temperatures, yet the material in most cases will be in somewhat molten condition and would, therefore, adhere to any cooling surface with which it came in contact. If the final temperature of the drying gas upon completion of evaporation, therefore, be above the melting point of the material desiccated, the said material must be reduced in temperature. This might be effected by so balancing the amount of evaporation to the amount of heat in the drying gas that the terminal temperature at completion of the drying operation will be at the desired point, while maintaining the humidity of such gas below the critical point. It is generally more satisfactory, however, to effect a chilling of the entire body and product in suspension thru the introduction of a much cooler gas, or by introducing the product into a zone of cooling gas.

As in the well-known processes of desiccating materials by spray-drying same, the amount of contained moisture and facility with which the product gives up its moisture and the temperature of the gaseous drying medium are controlling factors in determining the length of time necessary for exposure of the finely-divided material thereto. The action of the gaseous drying medium, however, may be modified and controlled thru the action of the heating (or cooling) jacket to provide a radiating portion or by the supplementary supplies of gaseous media, as hereinbefore set forth. In the drying of certain slurries or suspensions, the final temperature of the drying medium will be determined by the amount of moisture it is desired to retain in the finished product, as well as by the ease with which the moisture is freed from the solid product and the character of the material treated.

In the treatment of materials with low critical temperature characteristics, as fruit juices and the like, the exposure of same to extremely high temperatures is only momentary and the same suffer no serious effects, especially in view of a refrigerating action occurring and due to the rapid and intense evaporation produced. The dried particles, furthermore, are either immediately before, at, or immediately after drying, subjected to a cooling action.

In other cases, such as in the production of dry powdered products obtained, for example, from waste sulfite or pulp liquors and in the production of other powdered hygroscopic substances as salt, exposure to extremely high temperatures may be useful to provide a protecting shell or coating or glazed surface on the particles, which will render the dry powdered product much less hygroscopic. Also, additional substances may be introduced to provide a coating of such additional material upon the original particles. The first contact of the material with the desiccating gaseous medium will then be at the highest temperature of the latter and is relatively high as regards the critical temperature of such material, while the final temperature may or may not be above the boiling point of the solution.

In the preparation of anhydrous substances in the form of soluble non-caking powdered products, for example as powdered anhydrous aluminum sulfate and retaining a more or less percentage of the initial water of crystallization, a globular product may be produced, having a glazed surface, by momentarily exposing the material in finely-divided state to a desiccating gaseous medium at a temperature far in excess of the boiling point of such material.

The tower type of desiccator, illustrated in Figs. 1 to 4, may be modified by considerably increasing its diameter at the lower end (Figs. 6 and 7) to provide a diffusion or settling chamber 90 in which the product will be precipitated. It will then be removed thru an outlet 91 at the bottom by a spiral conveyer 92. The upper part of the tower 10 terminates at the settling chamber in a flaring outlet 93 which provides with the wall of the said settling chamber an annular outlet 94 therefrom and through which the spent gases pass to a suitable outlet duct 95.

Figure 8:
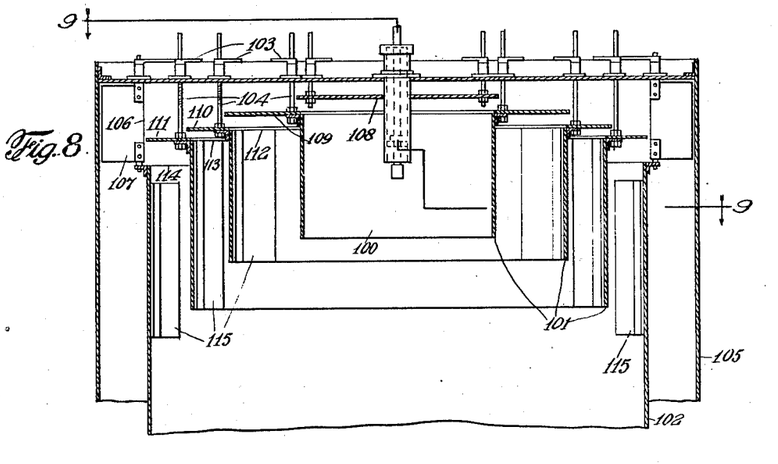
Fig. 8 is a fragmentary detail vertical section illustrating a modification in the tower head.
Figure 9:
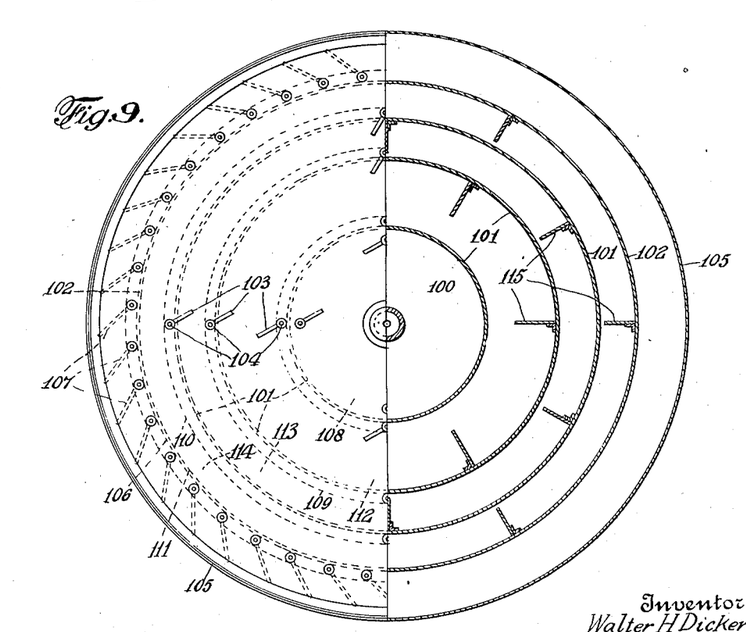
Fig. 9 is a transverse section thereof, taken on the line 9—9, Fig. 8, and looking in the direction of the arrows.

Furthermore, reference being had to Figs. 8 and 9, the head of the tower may be modified with respect to the manner of controlling the incoming gaseous medium. That is to say, there is provided about the central compartment 100, from which the spray is discharged into the tower out of the nozzle, a plurality of cylindrical members 101 displaced predetermined distances radially and disposed concentrically with respect thereto. These members are adjustable axially relatively to the said chamber; and in this manner the particular portion of the tower 102 at which a shell of the gaseous medium becomes effective may be adjusted to suit the desiccating requirements. The raising and lowering of these cylinders is accomplished by turning arms 103 at the top of the tower and on threaded rods 104 projecting thru the top and attached at their inner ends to the respective cylinders.

The upper portion of the tower 102, also, is surrounded by a cylinder 105 into which the gaseous desiccating medium is to be delivered; and a circular opening 106, controlled thru intermediate mechanism by vanes 107, admits same to the tower in regulatable quantities. The supply to the central compartment 100, moreover, is controllable thru a circular cover 108 over the top of same; and the supply to the various shells of gaseous medium projected thru the tower about the sprayed material, may be controlled by means of circular flanges 109, 110 and 111 of the respective cylinders, said flanges overlapping the circular entrance ports 112, 113 and 114, respectively, for producing the shells or envelopes of gaseous medium. From the various cylinders, moreover, there is arranged a plurality of vertically disposed rectifying vanes 115 directed radially inward and designed to prevent the formation of whirls and to maintain the substantially cylindircal form of the shells.

I claim:—

1. Apparatus for desiccating solid-containing liquids, comprising: a casing forming a dessicating chamber, an auxiliary casing communicating with one end thereof, a nozzle member axially mounted in said auxiliary casing, a plurality of radially directed vanes within the auxiliary casing, surrounding said nozzle and providing segmental passage-ways thru the auxiliary casing, said auxiliary casing having a peripheral opening to said passageways, and adjustable vanes to regulate the peripheral opening.

2. Apparatus for desiccating solid-containing liquids, comprising: a casing forming a desiccating chamber, an auxiliary casing communicating with one end thereof, a nozzle member axially mounted in said auxiliary casing, a plurality of radially directed vanes within the auxiliary casing, surrounding said nozzle and providing segmental passage-ways thru the auxiliary casing, said auxiliary casing having a peripheral opening to said passageways, adjustable vanes to regulate the peripheral opering, a casing surrounding said auxiliary casing, and means to supply a gaseous medium thereto.

3. Apparatus for desiccating solid-containing liquids, comprising: a casing forming a desiccating chamber, an auxiliary casing communicating with one end thereof, a nozzle member axially mounted in said auxiliary casing, a plurality of radially directed vanes within the auxiliary casing, surrounding said nozzle and providing segmental passage-ways thru the auxiliary casing, said auxiliary casing having a peripheral opening to said passageways, adjustable vanes to regulate the peripheral opening, a casing surrounding said auxiliary casing, and means to supply a gaseous medium thereto, said casing surrounding also the entrance portion of the desiccating chamber.

4. Apparatus for desiccating solid-containing liquids, comprising: a casing forming a desiccating chamber, an auxiliary casing communicating with one end thereof, a nozzle member axially mounted in said auxiliary casing, a plurality of radially directed vanes within the auxiliary casing, surrounding said nozzle and providing segmental passage-ways thru the auxiliary casing, said auxiliary casing having a peripheral opening to said passageways, adjustable vanes to regulate the peripheral opening, a casing surrounding said auxiliary casing, means to supply a gaseous medium thereto, said casing surrounding also the upper portion of the desiccating chamber, means to supply a gaseous medium to the portion surrounding the desiccating chamber and means to close off the latter portion of the said surrounding casing from the portion surrounding the auxiliary casing.

5. Apparatus for desiccating solid-containing liquids, comprising: a casing forming a desiccating chamber, an auxiliary casing communicating with one end thereof, a nozzle member axially mounted in said auxiliary casing, a plurality of radially directed vanes within the auxiliary casing, surrounding said nozzle and providing segmental passage-ways thru the auxiliary casing, said auxiliary casing having a peripheral opening to said passageways, adjustable vanes to regulate the peripheral opening, a casing surrounding said auxiliary casing, means to supply a gaseous medium thereto, said desiccating chamber being provided with openings to afford communication between the chamber surrounding said auxiliary casing and the said desiccating chamber, and means to control said openings.

6. Apparatus for the drying of liquid substances comprising a drying chamber, means for introducing the liquid substance to said chamber in finely divided condition, means for introducing drying gas to the interior of the said apparatus, means establishing communication between said point of introduction and said drying chamber whereby to enable said drying gas to mingle with and dry said finely divided liquid and rectifying means acting upon the incoming drying gas between the point at which it is introduced into the apparatus and the point at which it contacts with the said finely divided liquid substance to restrict the whirling thereof during the initial contact of the gas with the finely divided liquid.

7. Apparatus of the class described which comprises a drying chamber, means for introducing a current of drying gas into said chamber, means acting upon said introduced gas for restricting whirling and eddying thereof and causing said current of gas to progress through said drying chamber in a straight orderly flow, and means for spraying the liquid to be dried into said straight flowing gas current in such manner that the sprayed liquid is distributed across the section of the gas current and is immediately propelled away from the spraying means along through the drying chamber with the gas current in concurrent flow.

8. Apparatus for the drying of liquid substances which comprises a drying chamber, means for introducing a current of drying gas into said chamber, means for introducing into this current of gas a spray of the liquid to be dried directed to immediately proceed across the section of the gas current and along with it through the drying chamber in concurrent flow, and means acting upon said incoming gas for effecting distribution thereof across the full section of the drying chamber where the said spray is introduced and controlling said gas during its expansion into said section of the chamber to restrict whirling and eddying thereof.

9. Apparatus of the class described comprising a drying chamber, means for spraying into said chamber the liquid to be dried, means for bringing a gaseous drying medium into contact with the said sprayed liquid to effect drying thereof and vanes extending longitudinally of the drying chamber and positioned radially thereof to restrict circumferential movement of the drying gas and thereby prevent whirling of wet particles against the walls of said chamber.

10. Apparatus for the drying of liquid substances comprising a drying chamber, a spray nozzle for introducing the liquid into said chamber in finely divided condition, means for bringing a current of drying gas into contact with the sprayed liquid to effect drying thereof and passing said gas along the length of said drying chamber, and plane baffles positioned above the said spray nozzle lying in planes parallel to the longitudinal axis of the said drying chamber and acting upon the incoming drying gas before said gas contacts with the sprayed liquid to thereby minimize whirling and eddying in the gas current immediately before it contacts with said spray.

11. Apparatus of the class described comprising a cylindrical drying chamber, a spray nozzle within said chamber for introducing the liquid to be dried, means for introducing a gaseous drying medium into contact with the said sprayed liquid to effect drying thereof and baffles extending longitudinally of the walls of the drying chamber and projecting radially therefrom toward the center of the chamber to thereby check circumferential whirling within said chamber.

12. Spray drying apparatus of the class described comprising a vertically positioned circular cylindrical drying tower, a furnace for heating drying gas, means for spraying the liquid to be dried into the central part of the upper portion of said drying chamber, an inlet opening in the upper portion of said drying chamber for permitting admission of drying gas and the descent thereof to surround the spray issuing from said spraying means in uniform contact therewith on all sides, means at a point substantially below the said spraying means and extending completely around the stream of down-flowing hot gas and sprayed material within said tower for permitting introduction of cooling gas into the entire body of material flowing through said tower, an outlet for permitting discharge from said drying tower of the dried material together with the drying gas and the moisture carried thereby, a dry collector for receiving said mixed gas, vapors and solids and retaining the major portion of the solids, a wet collector for receiving the vapors and gases passing said dry collector and collecting therefrom the residual amount of solid material which is carried thereby and a fan having its suction side connected to the discharge side of said wet collector for inducing the flow of drying gas through said inlet opening and downwardly along the length of the tower in uniform flow without appreciable agitation at any section of the tower and also establishing a flow of the entire contents of the drying chamber consisting of the intermixed hot drying air and cooling air together with the vapor and solid contents of the drying tower through the entire spray drying apparatus.

13. Spray drying apparatus of the class described comprising a vertically disposed drying chamber, spray nozzles for spraying the liquid to be dried into the upper part of said chamber, a furnace for heating the gaseous drying medium, means for delivering said heated drying medium to the upper portion of said drying chamber into contact with the sprayed liquid, means for admitting to the drying chamber at a point substantially below the spray nozzles a supply of relatively low temperature cooling air, an outlet at the lower end of said chamber, whereby the entire contents of the drying chamber consisting of the intermixed hot drying air and cooling air together with the vapor and solid contents of the chamber, are discharged continuously from the same point in the lower portion of the chamber, a collector for receiving said mixed gases, vapors and solids and retaining the major portion of the solids and a fan connected with the discharge side of said collector for withdrawing the vapors and gases therefrom to thereby establish the fluid flow throughout the entire spray drying apparatus comprising the furnace, the drying chamber and the collector.

14. Spray drying apparatus of the class described comprising a vertically disposed drying chamber, means for introducing drying gas to the chamber to contact with and dry said sprayed liquid, rectifying means acting upon the incoming drying gas to restrict the whirling thereof during the initial contact of the gas with the finely divided liquid to thereby minimize whirling of wet particles against the walls of the drying chamber and means for directing a current of the drying gas downwardly adjacent the walls of the drying chamber to thereby deflect particles approaching into proximity with said walls and thereby further preventing contact of wet particles with the said walls.

15. Apparatus for the drying of liquid substances comprising a drying chamber, spray nozzles for introducing the liquid in said chamber in finely divided condition, means for introducing a gaseous drying medium into contact with the sprayed liquid to effect drying thereof, plane baffles extending above the spray nozzles positioned in planes parallel to the length of said drying chamber and acting upon the incoming drying gas before said gas contacts with the sprayed liquid to thereby minimize whirling and eddying in the gas current immediately before it contacts with said spray, a circumferentially disposed opening for directing a scouring current of gas downwardly adjacent the walls of the drying chamber and a controllable damper cooperating with said inlet means for varying the size of the inlet opening and thus controlling the amount of gas devoted to the scouring of the walls.

16. Spray drying apparatus of the class described which comprises a drying chamber, a heating means for furnishing a supply of heated dryings gas, means whereby the said heated gas may be delivered to said drying chamber as a continuous current, means acting upon said incoming gas for restricting whirling and eddying thereof and causing said current of gas to progress through said drying chamber in a straight orderly flow, means for spraying the liquid to be dried into the initial portion of the current of drying gas in said chamber in such manner that the spray is immediately propelled away from the spraying means along through the drying chamber with the gas current in concurrent flow, said chamber having an outlet at its end generally opposite the point at which the drying gas is introduced, a collector communicating by means of said opening with said chamber to receive the entire contents of said chamber consisting of intermixed spent drying gas, vapor, and solid contents, and to retain the major portion of the solid contents, a fan communicating with the discharge side of said collector for withdrawing the vapors and spent gases therefrom, whereby said contents of the drying chamber are passed through the entire length of the chamber in straight orderly concurrent flow, and are drawn through said opening into said collector.

Signed at New York in the county of New York and State of New York this 8th day of January A. D. 1923.

WALTER H. DICKERSON.